July 2, 1957

A. E. LAGERDAHL 2,797,499

EDUCATIONAL DEVICE

Filed Oct. 29, 1953

INVENTOR.
Ann E. Lagerdahl
BY
Robt. W. Pearson
ATTORNEY.

United States Patent Office 2,797,499
Patented July 2, 1957

2,797,499
EDUCATIONAL DEVICE

Ann E. Lagerdahl, Los Angeles, Calif.

Application October 29, 1953, Serial No. 389,090

1 Claim. (Cl. 35—31)

My invention relates to educational devices, and more particularly to an educational device wherein each arithmetical table is separate so that the child can concentrate on one table at a time, which is the approved method of teaching used in most schools.

An important object of the invention is to provide an educational device having a black background with easy to read numerals in white, thus eliminating any eye strain that might usually be present.

Another object of the invention is to change an unattractive and dull subject, which requires concentration of young children amidst many distractions, into a fascinating game due to the aliveness of the moving disc.

A further object is to provide an educational device that is a complete unit with no separate parts to be lost or misplaced.

My invention should meet with the approval of the parents as well as the educators, since it teaches fundamental operations in the science of mathematics in a convenient and fascinating way that may ultimately lend itself to its use on educational programs in class rooms and in self education.

With the foregoing and other objects in view, my invention consists in certain novel features and arrangement of parts which will be hereinafter more fully described and claimed.

Referring to the accompanying drawing, which illustrates a preferred embodiment of the invention, Fig. 1 is a perspective view of my improved educational device, adapted to teach multiplication.

Figure 1:
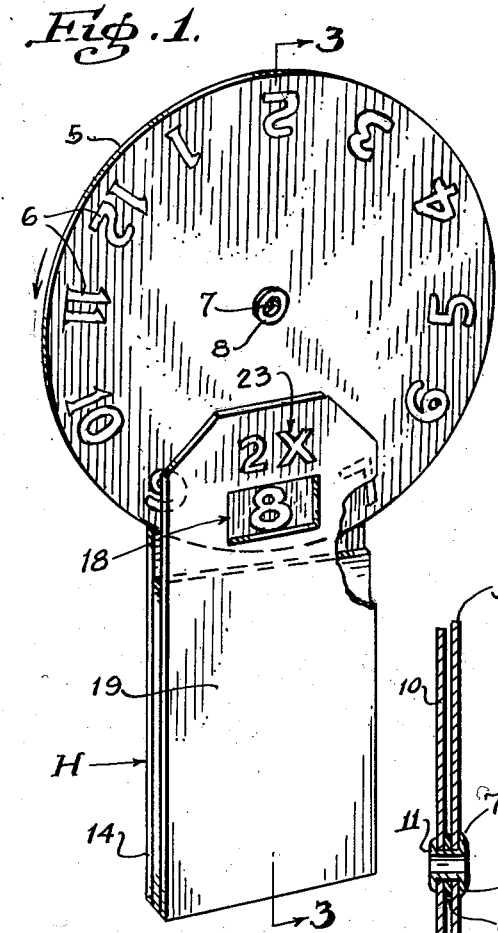
Figure 2:
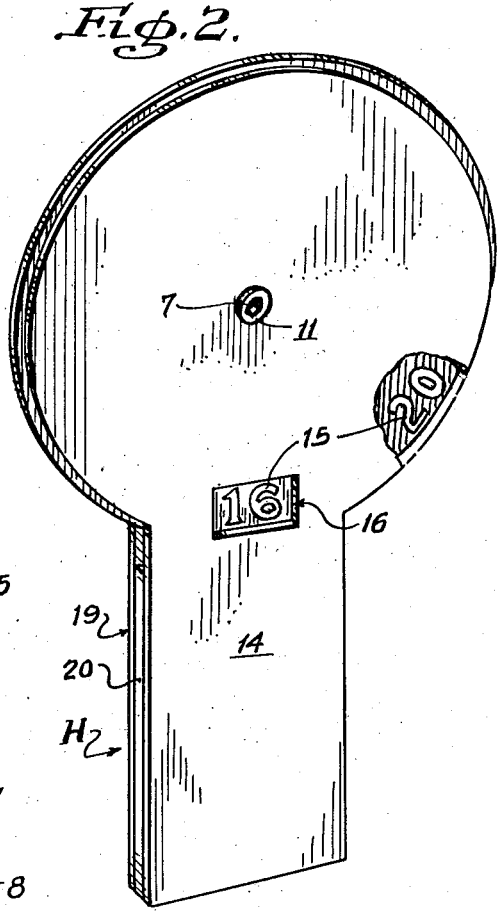
Fig. 2 is a similar view showing the back side of the device.
Figure 3:
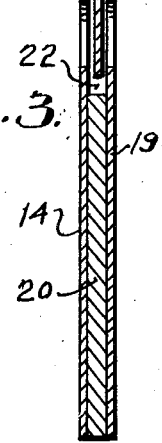
Fig. 3 is a vertical sectional view on line 3—3 of Fig. 1.

Referring to the drawings in detail, the numeral 5 designates the revolving disc having arranged about the periphery thereof a series of consecutive numerals 6, used in this particular adaption for the teaching of multiplication. The revolving disc 5 is centrally bored to receive a rivet 7 which has a turned over retaining flange 8, the rivet extending through the spacer member 9 and an upright supporting member 10, and terminating in a retaining flange 11 on the back face of the disc 10.

From the foregoing it will be evident that the disc 5 is mounted upon the upright member 10 by means of a rivet 7 so that it may be readily revolved by the user of the device due to the member 10 being smaller than the disc 5. The upright member 10 is a circularly expanded upper part of a downwardly extending handle forming portion 14. The revolving disc, on its back face, which is normally covered by the back disc 10, is provided with a series of answer numerals 15 about its periphery in circumferential alinement with a window 16 in the upright member 10.

Owing to the aforesaid retaining flange 8 of the rivet 7 directly engaging the spinnable disc 5, said member 10 is shortened for it need overlie the lower part of said disc 5.

The numerals 6 on the front face and the numerals 15 on the back face of the disc 5 are equally spaced about the periphery of the disc so that the required answer number 15 will appear in the window 16 in the lower portion of the circularly expanded part 10, at the same time as the number to be multiplied will appear in the window 18 of the front plate 19 of the device. The plate 19 and the extension 14 of the upright member are of equal size and are joined by a spacer plate 20, disposed therebetween and fixed thereto by glue or the like, so as to provide a space 22 in which the lower portion of the disc 5 is guided and revolves. In the present instance the multiplier "2" is printed on the front plate 19 just above the window 18 along with the characteristic 23, signifying multiplication. Since the number to be multiplied, in this instance "8" appears in the window 18, it is evident that all the information needed by the student is provided in a convenient manner that is designed to arouse the interest of the student and give to the usually dull operation a fascinating game-like quality.

Figure 4:
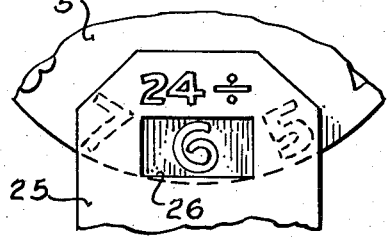
Fig. 4 is a fragmentary view of a modified of the invention adapted for the teaching of division.

Fig. 4 is a fragmentary view showing a modified form of the invention adapted to teach division. The disc 5' is here associated with a front plate 25 which has a window 26 adapted to reveal the divisor, in this instance "6," and just above the window the numeral to be divided, in this instance "24." The answer numerals will appear as usual on the back face of the disc 5', and will be revealed through a window similar to 16.

Owing to the fact that the alined sight openings 16 and 18 are so arranged that when a problem numeral appears in the one of them which is in front, and the answer to the problem appears only in the sight opening at the opposite or back of the device, the user of the device must retain the answer in his mind while reversing the position of the device to verify his answer. He cannot glance directly from the problem to its answer. This feature contributes considerably to the memory training quality of the article.

From the foregoing it will be seen that I have provided an improved educational device that is simple, practical and efficient in operation, durable and inexpensive in construction, and having no separate parts to be lost or misplaced. All the information needed to solve the problem is furnished on the front of the device and it is obvious that the disc 5 being slightly larger in circumference than the disc 10 may be readily revolved to present a new problem. The handle H makes the device readily turnable so that the answer on the back side of the device may also be readily seen by the student to check himself therewith.

The disc 5 may be so loosely mounted that it readily spins, thus adding an element of chance to the operation of the device which increases a child's interest therein.

It will be understood that minor changes in the size, shape and arrangement of the parts may be made without departing from the spirit of the invention.

I claim:

An educational device of the kind described comprising an upright handle member, the upper end portion of which is circularly expanded, said expanded portion having a window in its lower part, a turnable, disc, and a rivet centrally connecting said disc with the central part of said expanded portion so that the parts thus connected are closely adjacent and parallel with each other, said rivet having a peripheral flange which overlies and engages that face of said disc which is directed away from said expanded portion and which thereby prevents said disc from becoming detached from the device, said upright member comprising a plate portion downwardly spaced from said rivet and overlying only the lower part of that face of said disc which is engaged by the aforesaid rivet flange, said disc having along the peripheral portion of its front face a series of numbers each of which represents one of the parts of a problem, and upon the peripheral portion of its back face a series of corresponding answer numerals, and said plate portion having a window therein overlying the lower portion of said disc and adjacent to said window a designation which is combinable with each of the aforesaid numerals on the back face of said disc individually to complete said problems, said two series of numerals being so arranged that when a problem part appears in one of said windows the answer to the problem appears only in the other window.

References Cited in the file of this patent

UNITED STATES PATENTS

| | | |
|---|---|---|
| 1,311,682 | Drew | July 29, 1919 |
| 1,343,112 | Charrier | June 8, 1920 |
| 1,346,929 | Zion | July 20, 1920 |
| 1,728,584 | Wright | Sept. 17, 1929 |
| 1,816,760 | Barnowitz | July 28, 1931 |

FOREIGN PATENTS

| | | |
|---|---|---|
| 309,651 | Italy | July 12, 1933 |